(12) United States Patent
Kim et al.

(10) Patent No.: US 8,947,332 B2
(45) Date of Patent: Feb. 3, 2015

(54) LIQUID CRYSTAL DISPLAY DEVICE HAVING AN ELECTROSTATIC DISCHARGE PROTECTION CIRCUIT

(75) Inventors: Woong Sik Kim, Anyang-si (KR); Do Young Lee, Seoul (KR); Kyung Ho Lee, Seoul (KR); Bum Sik Kim, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 1084 days.

(21) Appl. No.: 12/005,618

(22) Filed: Dec. 28, 2007

(65) Prior Publication Data
US 2008/0218652 A1  Sep. 11, 2008

(30) Foreign Application Priority Data
Dec. 29, 2006  (KR) .............................. 2006-138722

(51) Int. Cl.
G09G 3/36 (2006.01)
G02F 1/1362 (2006.01)

(52) U.S. Cl.
CPC ................................. *G02F 1/136204* (2013.01)
USPC ............................................. 345/87; 349/40

(58) Field of Classification Search
CPC ....................... G02F 1/136204; G09G 2330/08
USPC ............................................. 345/87; 349/40
See application file for complete search history.

(56) References Cited

U.S. PATENT DOCUMENTS

| | | | | |
|---|---|---|---|---|
| 6,696,701 | B2 * | 2/2004 | Hector et al. | 257/72 |
| 7,046,030 | B2 * | 5/2006 | Kim et al. | 324/770 |
| 7,420,251 | B2 * | 9/2008 | Chen et al. | 257/355 |
| 7,453,420 | B2 * | 11/2008 | Watanabe et al. | 345/55 |
| 7,738,223 | B2 * | 6/2010 | Ker et al. | 361/56 |
| 7,795,684 | B2 * | 9/2010 | Lin et al. | 257/355 |
| 2001/0045998 | A1 * | 11/2001 | Nagata et al. | 349/40 |
| 2003/0020845 | A1 * | 1/2003 | Lee et al. | 349/40 |
| 2003/0030054 | A1 * | 2/2003 | Hector et al. | 257/72 |
| 2006/0164564 | A1 * | 7/2006 | Choi et al. | 349/33 |
| 2006/0170641 | A1 * | 8/2006 | Song et al. | 345/98 |
| 2007/0187762 | A1 * | 8/2007 | Saiki et al. | 257/355 |
| 2010/0181572 | A1 * | 7/2010 | Lee et al. | 257/59 |

FOREIGN PATENT DOCUMENTS

| | | | | |
|---|---|---|---|---|
| JP | 2005-115049 | | 4/2005 | |
| JP | 2005115049 | A * | 4/2005 | ............. G02F 1/136 |

* cited by examiner

*Primary Examiner* — Kwang-Su Yang
(74) *Attorney, Agent, or Firm* — McKenna Long & Aldridge LLP (57) ABSTRACT

A liquid crystal display device comprises a liquid crystal display panel having liquid crystal cells which are defined by a gate line and a data line and which are arranged in a matrix type, an electrostatic discharge protection circuit mounted on the liquid crystal display panel and connected to any one of the gate line and the data line, a first voltage supply line supplying the same voltage as a first gate voltage with which the gate line is supplied to the electrostatic discharge protection circuit, and a second voltage supply line supplying the same voltage as a second gate voltage with which the gate line is supplied to the electrostatic discharge protection circuit.

5 Claims, 7 Drawing Sheets

LIQUID CRYSTAL DISPLAY DEVICE HAVING AN ELECTROSTATIC DISCHARGE PROTECTION CIRCUIT

This application claims the benefit of Korean Patent Application No. P2006-138722 filed on Dec. 29, 2006, which is hereby incorporated by reference for all purposes as if fully set forth herein.

BACKGROUND OF THE INVENTION

1. Field of the Invention

The present invention relates to a liquid crystal display device, and more particularly to an electrostatic discharge protection circuit for a liquid crystal display device.

2. Description of the Related Art

The display device has become very important as a visual information communicating media in information society. The Cathode Ray Tube (CRT), which has been the mainstream display device, typically has a problematic large weight and bulk. Accordingly, various flat panel display devices have been developed capable of eliminating the weight and bulk disadvantages associated with CRT based displays.

Flat panel display devices include a liquid crystal display device (hereinafter, referred to as "LCD"), a field emission display (hereinafter, referred to as "FED"), a plasma display panel (hereinafter, referred to as "PDP"), and an electroluminescence (hereinafter, referred to as "EL"). Most of these flat panel display devices have been put to practical use and have a significant share of the display device market.

Because the liquid crystal display devices can be produced with thin profiles and light weight electronics and because of process improvements in the manufacturing the liquid crystal display devices, the cathode ray tube has rapidly been replaced with the liquid crystal display device in many application areas.

Liquid crystal display devices control light transmittance of liquid crystal cells in accordance with a video signal to display a picture corresponding to the video signal on a liquid crystal display panel having liquid crystal cells arranged in a matrix. To this end, a liquid crystal display device includes a liquid crystal display panel having liquid crystal cells arranged in a matrix, and driving circuits that drive the liquid crystal display panel. The liquid crystal cells are defined by the crossing of gate lines with data lines.

The liquid crystal display panel includes a thin film transistor array substrate and a color filter array substrate that are bonded together with having a liquid crystal therebetween.

Electrostatic discharges of high voltage generated near the liquid crystal display panel of the liquid crystal display device during the manufacturing process or in the manufacturing environment may cause damage to signal lines such as a gate line and a data line within the liquid crystal display panel, to thin film transistors, and to other liquid crystal display panel components.

Accordingly, in order to protect a plurality of signal lines and a thin film transistor, or other components from the electrostatic discharge, an electrostatic discharge protection circuit is provided within the liquid crystal display panel.

Figure 1:
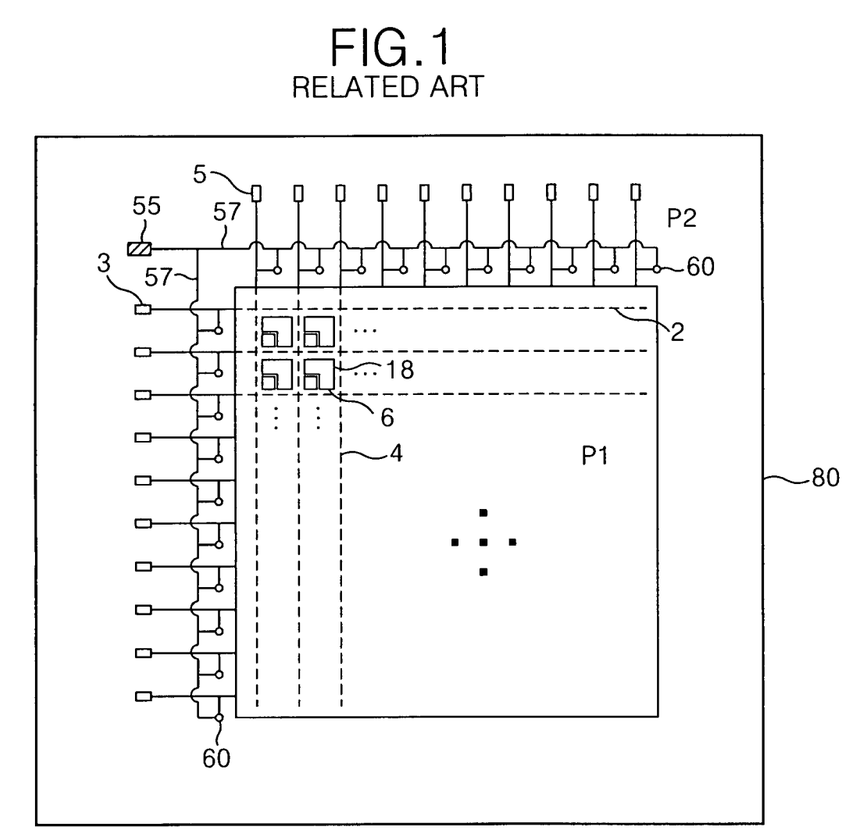
FIG. 1 is a plan view showing a liquid crystal display panel on which an electrostatic discharge protection circuit is formed.

FIG. 1 is a plan view showing a thin film transistor array substrate of a liquid crystal display panel that includes an electrostatic discharge protection circuit.

Referring to FIG. 1, a gate line 2 and a data line 4, a thin film transistor 6, and a pixel electrode 18 are located in a display area P1 of the thin film transistor array substrate. Herein, the gate line 2 and the data line 4 cross each other. The thin film transistor 6 is formed near a crossing of the gate line 2 and the data line 4. The pixel electrode 18 is connected to the thin film transistor 6.

A gate pad 3, a data pad 5, and an electrostatic discharge protection circuit 60 are located in a non-display area P2 of the thin film transistor array substrate. Herein, the gate pad 3 is connected to the gate line 2 to supply a gate voltage to the gate line. The data pad 5 is connected to the data line 4 to supply a data voltage to the data line 4. The electrostatic discharge protection circuit 60 is formed between the gate line 2 and a common line 57 and between the data line 4 and the common line 57. Herein, the common line 57 is connected to a common pad 55 to be supplied with a reference voltage from the common pad 55. Alternately, the electrostatic discharge protection circuit 60 may be connected to a ground electrode instead of the common line 57.

Figure 2:
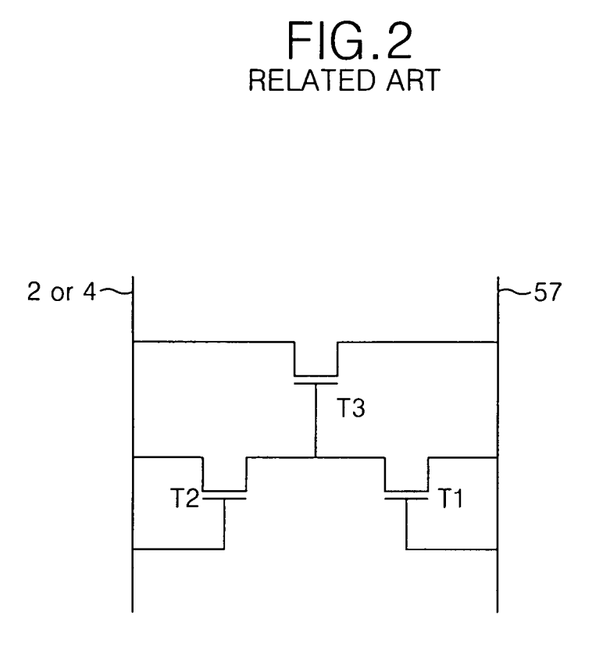
FIG. 2 is a schematic diagram illustrating the structure of the electrostatic discharge protection circuit in FIG. 1.

FIG. 2 is a schematic diagram showing details of the electrostatic discharge protection circuit 60 in FIG. 1.

Referring to FIG. 2, the electrostatic discharge protection circuit 60 is formed between the gate line 2 and the common line (or the ground electrode), or is formed between the common line (or the ground electrode) and the data line 4. FIG. 2 shows an example in which the electrostatic discharge protection circuit 60 is formed between the data line 4 and the common line 57.

The electrostatic discharge protection circuit 60 includes first to third transistors (T1 to T3). Herein, the first to third transistors (T1 to T3) are connected between the common line 57 and the data line 4.

If a voltage of more than a threshold voltage Vth for a transistor is applied to the common line 57, the first transistor T1 is turned-on to turn-on the third transistor T3 to allow a current from the common line 57 to be discharged toward the data line 4 via the third transistor T3. If a voltage of more than a threshold voltage Vth is applied to the data line 4, the second transistor T2 is turned-on to turn-on the third transistor T3 to allow a current from the data line 4 to be discharged toward the common line 57 via the third transistor T3. An electrostatic protection circuit having the identical structure and connected between the gate line 2 and the common line 57 may be driven using the same principle described above.

Figure 3:
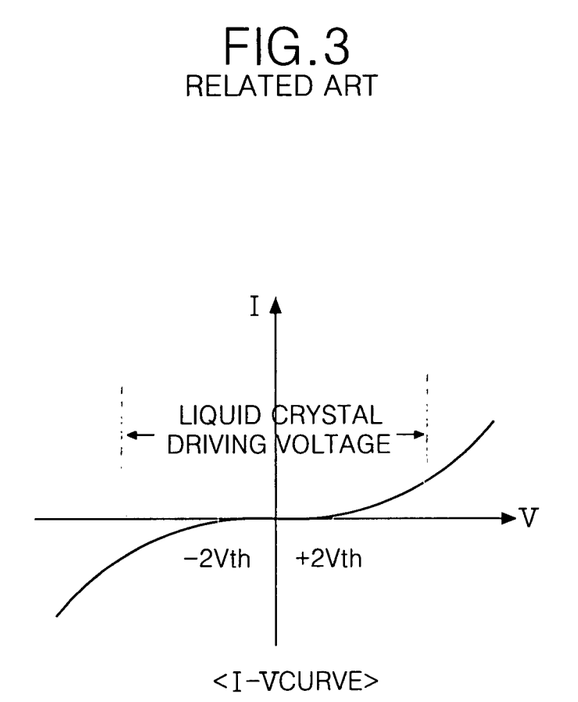
FIG. 3 is a diagram showing a I-V curve of the electrostatic discharge protection circuit in FIG. 2.

FIG. 3 is a diagram showing a I-V curve of transistors of the electrostatic discharge protection circuit in FIG. 2.

Referring to FIG. 3, a threshold voltage Vth of the first to third transistors T1 to T3 which are included in the electrostatic discharge protection circuit 60 of the related art is about 1V to 2V. On the other hand, a data voltage (or a liquid crystal driving voltage) is about 10V. Accordingly, if a voltage of about 2Vth is supplied to the first to third transistors T1 to T3, the first to third transistors T1 to T3 are turned-on.

For the a liquid crystal display panel of the related art, some current produced by the data voltage flows into the electrostatic discharge protection circuit 60 and is not available for driving the liquid crystal. Accordingly, the liquid crystal driving voltage is increased to compensate for the lost current. As a result of increasing the driving voltage, power consumption is increased when the liquid crystal display panel is driven to realize an image.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device that is adaptive for reducing power consumption.

These features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to an embodiment of the present invention includes a liquid crystal display panel where liquid crystal cells defined by a gate line and a data line are arranged in a matrix type; an electrostatic discharge protection circuit mounted on the liquid crystal display panel and connected to any one of the gate line and the data line; a first voltage supply line supplying the same voltage as a first gate voltage with which the gate line is supplied to the electrostatic discharge protection circuit; and a second voltage supply line supplying the same voltage as a second gate voltage with which the gate line is supplied to the electrostatic discharge protection circuit.

The electrostatic discharge protection circuit includes a first switch part which is connected to the data line and is connected to the first voltage supply line; and a second switch part which is connected to the data line and is connected to the second voltage supply line.

The first switch part is turned-on when a voltage higher than the first gate voltage is supplied to the data line, and the second switch part is turned-on when a voltage lower than the second gate voltage is supplied to the second voltage supply line.

The first switch part includes a first transistor which is connected to the data line and a second transistor which is connected to the first voltage supply line and is connected in series to the first transistor, and the second switch part includes a third transistor which is connected to the data line and a fourth transistor which is connected to the second voltage supply line and is connected in series to the third transistor.

The first gate voltage is a gate high voltage which turns-on a thin film transistor of the liquid crystal cell, and the second gate voltage is a gate low voltage which turns-off the thin film transistor.

The electrostatic discharge protection circuit includes a first switch part which is connected to the gate line and is connected to the first voltage supply line; and a second switch part which is connected to the gate line and is connected to the second voltage supply line.

The first switch part is turned-on when a voltage higher than the first gate voltage is supplied to the gate line, and the second switch part is turned-on when a voltage lower than the second gate voltage is supplied to the second voltage supply line.

The first switch part includes a first transistor which is connected to the gate line and a second transistor which is connected to the first voltage supply line and is connected in series to the first transistor, and the second switch part includes a third transistor which is connected to the gate line and a fourth transistor which is connected to the second voltage supply line and is connected in series to the third transistor.

The first gate voltage is a gate high voltage which turns-on a thin film transistor of the liquid crystal cell, and the second gate voltage is a gate low voltage which turns-off the thin film transistor.

In another aspect of the present invention, a liquid crystal display device according to an embodiment of the present invention includes a liquid crystal display panel where liquid crystal cells defined by a gate line and a data line are arranged in a matrix type; an electrostatic discharge protection circuit mounted on the liquid crystal display panel and connected to any one of the gate line and the data line; a first voltage supply line supplying the same voltage as a gate high voltage which selects the liquid crystal cell to the electrostatic discharge protection circuit; and a second voltage supply line supplying the same voltage as a gate low voltage which does not select the liquid crystal cell to the electrostatic discharge protection circuit, and wherein the electrostatic discharge protection circuit is driven by a voltage higher than the gate high voltage or a voltage lower than the gate low voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiment of the present invention, an example of which is illustrated in the accompanying drawings FIG. 4 to FIG. 6.

The liquid crystal display device according to the present invention includes a liquid crystal display panel having liquid crystal cells which are arranged in a matrix type and driving circuits supplying a driving voltage to the liquid crystal display panel. The liquid crystal display panel has liquid crystal cells which are arranged in a matrix type in a display area. An electrostatic discharge protection circuit and the associated pads are located in a non-display area.

Figure 4:
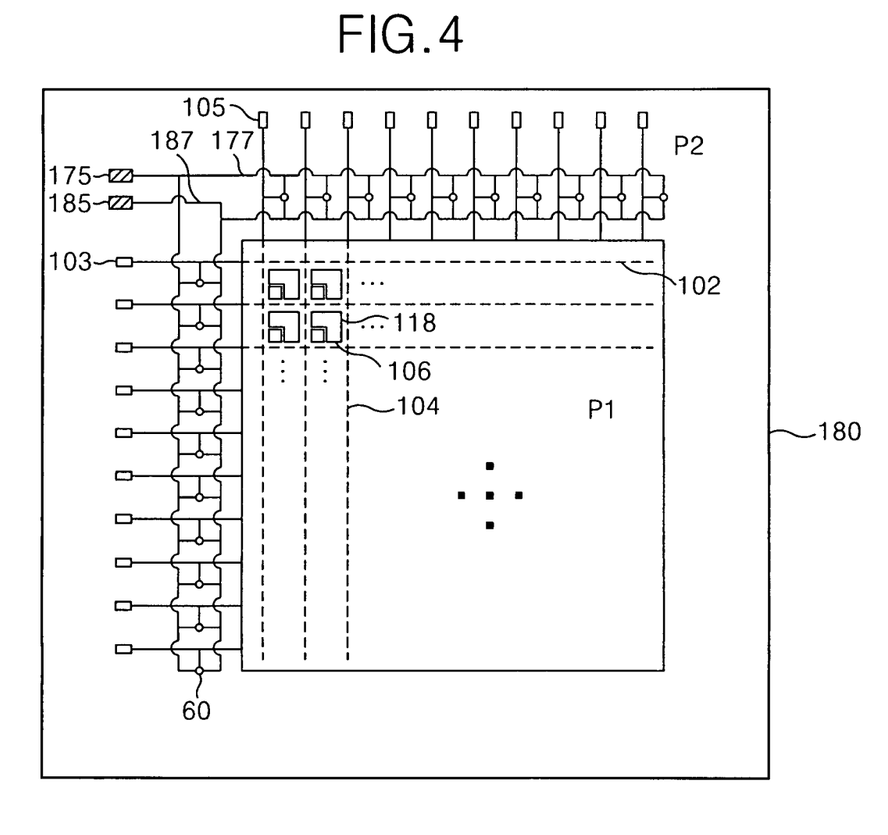
FIG. 4 is a plan view showing a liquid crystal display panel of a liquid crystal display device including an electrostatic discharge protection circuit in according to an embodiment of the present invention.

FIG. 4 is a plan view showing a liquid crystal display panel of a liquid crystal display device according to an embodiment of the present invention. More particularly, FIG. 4 shows a thin film transistor array substrate of the liquid crystal display panel.

The liquid crystal cells which are arranged in a matrix on a display area P1 of the thin film transistor array substrate in FIG. 4 include a gate line 102 and a data line 104, a thin film transistor 106, and a pixel electrode 118. Herein, the gate line 102 and the data line 104 crossed cross each other. The thin film transistor 106 is formed near a crossing area of the gate line 102 and the data line 104. The pixel electrode 118 is connected to the thin film transistor 106.

The thin film transistor 106 supplies a data voltage (or a pixel voltage) from the data line 104 to the liquid crystal cell in response to a gate voltage from the gate line 102.

A gate high voltage Vgh is sequentially supplied to the gate lines 102, and a gate low voltage Vgl is supplied to the gate lines 102 during a period excluding the period in which the gate high voltage Vgh is supplied. Herein, the gate high voltage Vgh turns on the thin film transistor 106, while the gate low voltage Vgl turns the thin film transistor 106 off.

A gate pad 103 and a data pad 105 are located in a non-display area P2 of the thin film transistor array substrate. Herein, the gate pad 103 is connected to the gate line 102 to supply a gate voltage to the gate line 102. The data pad 105 is connected to the data line 104 to supply a data voltage to the data line 104. Furthermore, a first voltage supply line 177, a second voltage supply line 187, and an electrostatic discharge protection circuit 160 are located in the non-display area P2 of the thin film transistor array substrate. Herein, the first voltage supply line 177 is supplied with a gate high voltage Vgh. The second voltage supply line 187 is supplied with a gate low voltage Vgl. The electrostatic discharge protection circuit 160 is connected to any one of the gate line 102 and the data line 104. In the illustrated embodiment, the electrostatic discharge protection circuit 160 is connected to the first voltage supply line 177 and the second voltage supply line 187. Moreover, a first voltage supply pad 175 and a second voltage supply pad 185 are also located in the non-display area P2. Herein, the first voltage supply pad 175 supplies a gate high voltage Vgh to the first voltage supply line 177. The second voltage supply pad 185 supplies a gate low voltage Vgl to the second voltage supply line 187.

Figure 5:
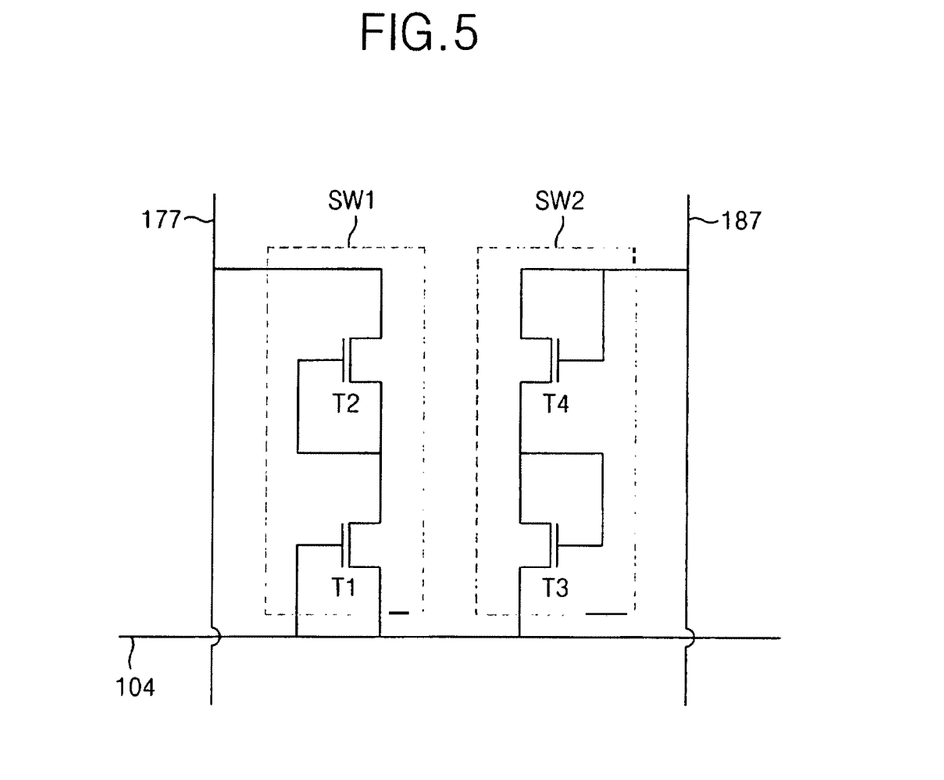
FIG. 5 is a schematic diagram illustrating details a structure of the electrostatic discharge protection circuit connected to a data line illustrated in FIG. 4.

FIG. 5 is a schematic diagram showing details of a structure of the electrostatic discharge protection circuit 160 in FIG. 4.

The electrostatic discharge protection circuit 160 in FIG. 5 includes a first switch part SW1 and a second switch part SW2. As illustrated in FIG. 5, the first switch part SW1 is connected between the data line 104 and the first voltage supply line 177, while the second switch part SW2 is connected between the data line 104 and the second voltage supply line 187.

The first switch part SW1 includes a first transistor T1 and a second transistor T2 connected in series. In the example case of FIG. 5, the first transistor T1 is connected to the data line 104, while the second transistor T2 is connected to the first voltage supply line 177. The second switch part SW2 includes a third transistor T3 and a fourth transistor T4, and the third and fourth transistors T3 and T4 connected in series. The third transistor T3 is connected to the data line 104, while the fourth transistor T4 is connected to the second voltage supply line 187.

As described above the electrostatic discharge protection circuit 160 is connected to the data line 104. However, an electrostatic discharge protection circuit having an identical structure may be connected to the gate line 102, as shown in FIG. 7.

Figure 7:
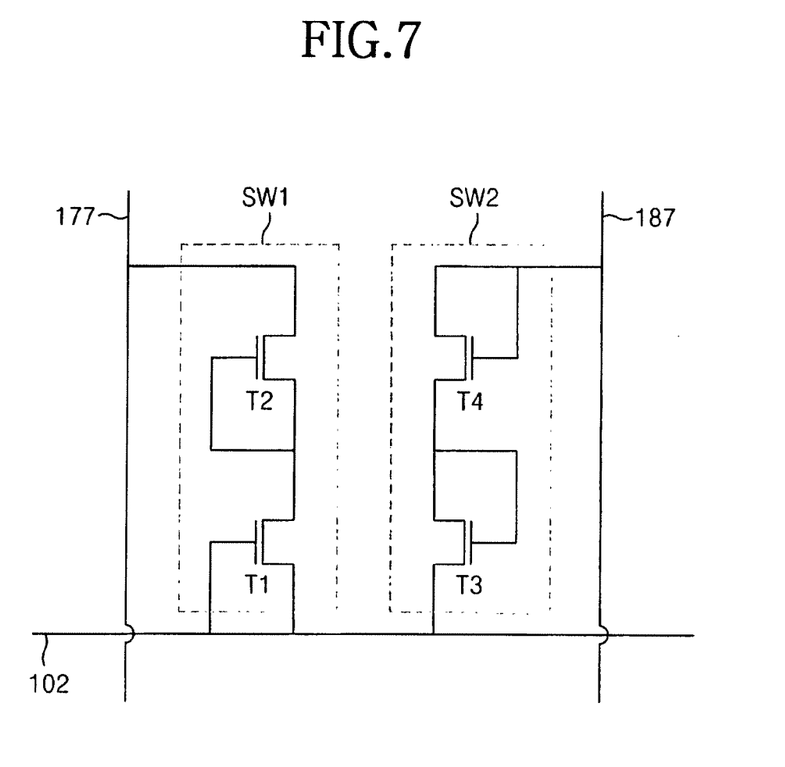
FIG. 7 is a schematic diagram illustrating details a structure of the electrodstatic discharge protection circuit connected to a gate line illustrated in FIG. 4.

The electrostatic discharge protection circuit 160 in FIG. 7 includes a first switch part SW1 and a second switch part SW2. As illustrated in FIG. 7, the first switch part SW1 is connected between the gate line 102 and the first voltage supply line 177, while the second switch part SW2 is connected between the gate line 102 and the second voltage supply line 187.

The first switch part SW1 includes a first transistor T1 and a second transistor T2 connected in series. In the example case of FIG. 7, the first transistor T1 is connected to the gate line 102, while the second transistor T2 is connected to the first voltage supply line 177. The second switch part SW2 includes a third transistor T3 and a fourth transistor T4 connected in series. The third transistor T3 is connected to the gate line 102, while the fourth transistor T4 is connected to the second voltage supply line 187.

A gate high voltage Vgh of about +20V may be supplied to the first voltage supply line 177. A gate low voltage Vgl of about −5V may be supplied to the second voltage supply line 187.

The above described electrostatic discharge protection circuit 160 is activated by a voltage higher than a gate high voltage Vgh or a voltage lower than a gate low voltage Vgl. For the liquid crystal display panel 180 of FIG. 4, the gate high voltage Vgh selects the liquid crystal cell when it is applied to the corresponding gate line, while the gate low voltage Vgl deselects the liquid crystal cell. On the other hand, the electrostatic discharge protection circuit 160 is deactivated for voltages within the range between the gate high voltage Vgh and the gate low voltage Vgl.

In particular, when a voltage higher than a gate high voltage Vgh is applied via the data line 104 owing to an electrostatic charge, the first switch part SW1 is switched (turned-on). Accordingly, the electrostatic charge is discharged via the data line 104 and the first switch part SW1, to the first voltage supply line 177. When a voltage lower than a gate low voltage Vgl is applied to the second voltage supply line 187, the second switch part SW2 is switched (turned-on). Accordingly, an electrostatic charge is discharged via the second voltage supply line 187 and the second switch part SW2 to the data line 104.

Furthermore, if a voltage higher than a gate high voltage Vgh is applied via the gate line 102 owing to an electrostatic charge, the first switch part SW1 is switched (turned-on). Accordingly, an electrostatic charge is discharged via the gate line 102 and the first switch part SW1 to the first voltage supply line 177. On the other hand, if a voltage lower than a gate low voltage Vgl is applied to the second voltage supply line 187, the second switch part SW2 is switched (turned-on). Accordingly, an electrostatic charge is discharged via the second voltage supply line 187 and the second switch part SW2 to the gate line 102.

If a voltage between a gate high voltage Vgh and a gate low voltage Vgl is supplied to the electrostatic discharge protection circuit 160, the first and second switch parts SW1 and SW2 are maintained in a turned-off state.

Figure 6:
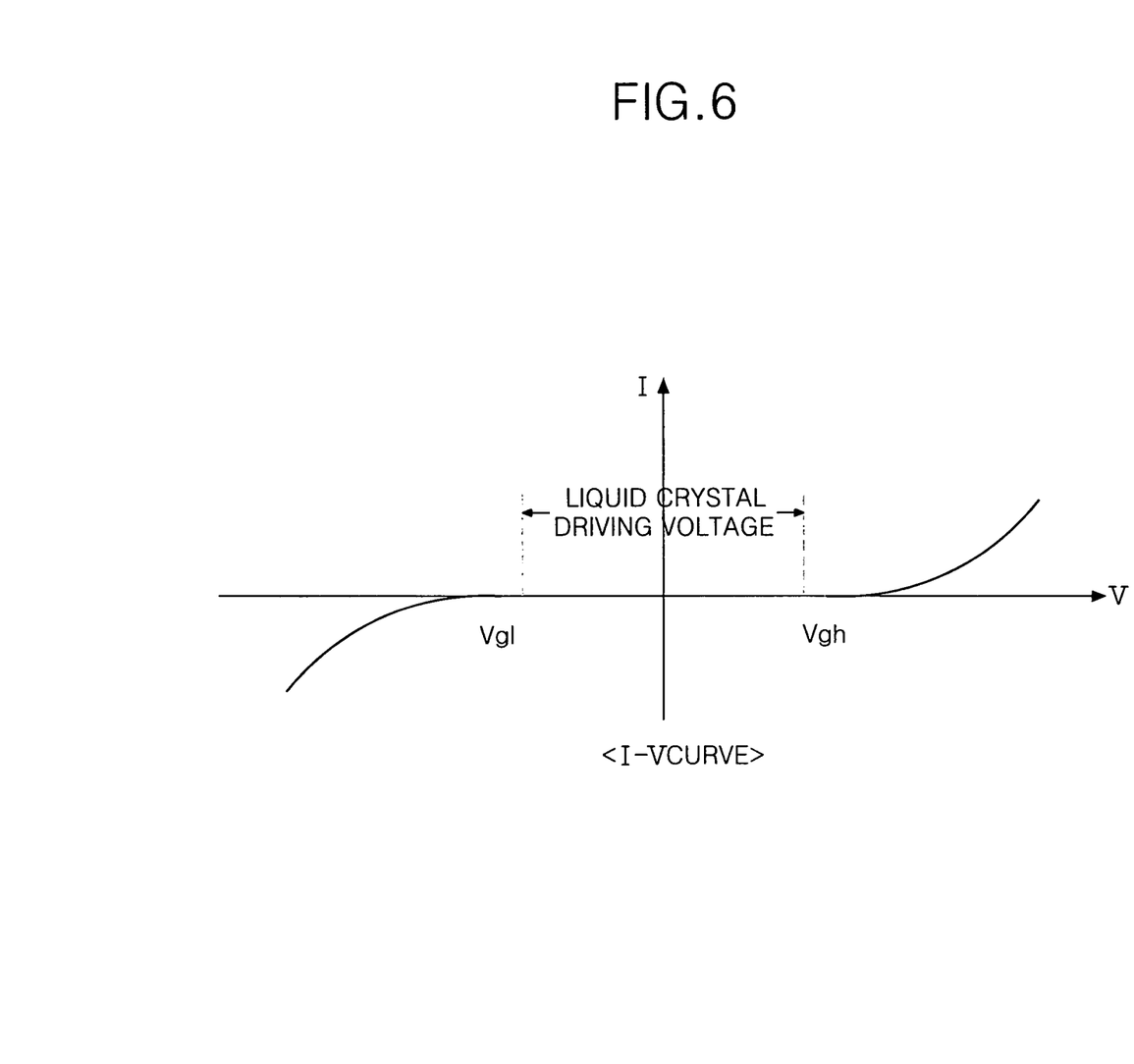
FIG. 6 is a diagram showing a I-V curve of the electrostatic discharge protection circuit illustrated in FIG. 5.

Referring to FIG. 6, a typical data voltage (or a liquid crystal driving voltage) is about 10V. On the other hand, a voltage difference between a gate high voltage Vgh and a gate low voltage Vgl is typically more than 20V. Accordingly, when a data voltage for realizing an image is supplied, the data voltage does not generate a flow of current into the electrostatic discharge protection circuit 160. As a result, a loss of current into the electrostatic discharge protection circuit 160 can be reduced or eliminated allowing reduced overall power consumption for driving the liquid crystal display device.

As described above, the liquid crystal display device according to the present invention supplies the gate high voltage and a gate low voltage with which the gate line is driven to the electrostatic discharge protection circuit. Accordingly, a liquid crystal display device according to the present invention can reduce or eliminate data current for driving a liquid crystal from flowing into the electrostatic discharge protection circuit, and can allow reduce a power consumption when driving the liquid crystal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal display panel comprising a plurality of liquid crystal cells, the plurality of liquid crystal cells defined by crossings of a plurality of gate lines and a plurality of data lines, a gate high voltage and a gate low voltage being supplied to the plurality of gate lines;
   a plurality of first electrostatic discharge protection circuits mounted on the liquid crystal display panel, the plurality of first electrostatic discharge protection circuits connected to the plurality of gate lines, respectively;
   a first voltage supply line connected to the plurality of first electrostatic discharge protection circuits, the gate high voltage being supplied to the first voltage supply line; and
   a second voltage supply line connected to the plurality of first electrostatic discharge protection circuits, the gate low voltage being supplied to the second voltage supply line,
   wherein the plurality of first electrostatic discharge protection circuits each includes:
   a first switch part including a first transistor connected to a respective gate line and a second transistor connected to the first voltage supply line; and
   a second switch part including a third transistor connected to the respective gate line and a fourth transistor connected to the second voltage supply line,
   wherein the plurality of first electrostatic discharge protection circuits each is activated by a first voltage higher than a total value of the gate high voltage and a first threshold voltage of the first switch part or a second voltage lower than a total value of the gate low voltage and a second threshold voltage of the second switch part, and
   wherein the first voltage or the second voltage is supplied to the respective gate line.

2. The liquid crystal display device according to claim 1, further comprising:
   a plurality of second electrostatic discharge protection circuits mounted on the liquid crystal display panel, the plurality of second electrostatic discharge protection circuits connected to the plurality of data lines, respectively,
   wherein the plurality of second electrostatic discharge protection circuits each includes:
   a first switch part connected to a respective data line and the first voltage supply line; and
   a second switch part connected to the respective data line and the second voltage supply line,
   wherein the plurality of second electrostatic discharge protection circuits each is activated by a first voltage higher than a total value of the gate high voltage and a first threshold voltage of the first switch part or a second voltage lower than a total value of the gate low voltage and a second threshold voltage of the second switch part, and
   wherein the first voltage or the second voltage is supplied to the respective data line.

3. The liquid crystal display device according to claim 2, wherein the first switch part connected to the respective data line turns on upon supplying the first voltage to the respective data line, and wherein the second switch part connected to the respective data line turns on upon supplying the second voltage to the respective data line.

4. The liquid crystal display device according to claim 1, wherein the first switch part connected to the respective gate line turns on upon supplying the first voltage to the respective gate line, and wherein the second switch part connected to the respective gate line turns on upon supplying the second voltage to the respective gate line.

5. A liquid crystal display device, comprising:
   a liquid crystal display panel comprising a plurality of liquid crystal cells, the plurality of liquid crystal cells defined by crossings of a plurality of gate lines and a plurality of data lines, a gate high voltage and a gate low voltage being supplied to the plurality of gate lines;
   a plurality of first electrostatic discharge protection circuits mounted on the liquid crystal display panel, the plurality of first electrostatic discharge protection circuits connected to the plurality of data lines, respectively;
   a first voltage supply line connected to the plurality of first electrostatic discharge protection circuits, the gate high voltage being supplied to the first voltage supply line; and
   a second voltage supply line connected to the plurality of first electrostatic discharge protection circuits, the gate low voltage being supplied to the second voltage supply line,
   wherein the plurality of first electrostatic discharge protection circuits each includes:
   a first switch part including a first transistor connected to a respective data line and a second transistor connected to the first voltage supply line; and
   a second switch part including a third transistor connected to the respective data line and a fourth transistor connected to the second voltage supply line,
   wherein the plurality of first electrostatic discharge protection circuits each is activated by a first voltage higher than a total value of the gate high voltage and a first threshold voltage of the first switch part or a second voltage lower than a total value of the gate low voltage and a second threshold voltage of the second switch part, and
   wherein the first voltage or the second voltage is supplied to the respective data line.

* * * * *